US008582969B1

(12) United States Patent
Sandstrom et al.

(10) Patent No.: US 8,582,969 B1
(45) Date of Patent: Nov. 12, 2013

(54) PASSIVE OPTICAL NETWORK (PON) HAVING OPTICAL NETWORK UNIT (ONU) USING FEEDBACK TO DETECT ROGUE CONDITIONS AND RELATED METHOD

(75) Inventors: Leif J. Sandstrom, Madison, AL (US); Philip D. Williams, Madison, AL (US); Richard L. Goodson, Huntsville, AL (US)

(73) Assignee: Adtran, Inc., Huntsville, AL (US)

( * ) Notice: Subject to any disclaimer, the term of this patent is extended or adjusted under 35 U.S.C. 154(b) by 299 days.

(21) Appl. No.: 12/955,949

(22) Filed: Nov. 30, 2010

(51) Int. Cl.
*H04B 10/07* (2013.01)

(52) U.S. Cl.
USPC ................................ 398/66; 398/17; 398/195

(58) Field of Classification Search
USPC ........................................ 398/67–73, 17, 195
See application file for complete search history.

(56) References Cited

U.S. PATENT DOCUMENTS

| | | | | |
|---|---|---|---|---|
| 5,674,422 | A | * | 10/1997 | Marinus ........................ 219/497 |
| 5,710,721 | A | * | 1/1998 | Rieckhoff et al. .............. 714/51 |
| 7,261,473 | B2 | | 8/2007 | Owen et al. ..................... 385/88 |
| 7,468,958 | B2 | | 12/2008 | Emery et al. ................... 370/321 |
| 7,778,543 | B2 | | 8/2010 | Ferguson et al. ............... 398/15 |
| 7,818,648 | B2 | | 10/2010 | Haran .......................... 714/752 |
| 2004/0033077 | A1 | | 2/2004 | Kim et al. ........................ 398/72 |
| 2006/0093356 | A1 | * | 5/2006 | Vereen et al. ................... 398/33 |
| 2006/0198635 | A1 | | 9/2006 | Emery et al. .................... 398/38 |
| 2007/0143645 | A1 | | 6/2007 | Haran ............................ 714/704 |
| 2007/0201867 | A1 | | 8/2007 | DeLew et al. ................... 398/38 |
| 2007/0264016 | A1 | | 11/2007 | DeLew ............................ 398/71 |
| 2007/0268818 | A1 | | 11/2007 | Sugihara ........................ 370/216 |
| 2007/0274719 | A1 | | 11/2007 | Ferguson et al. ............... 398/66 |
| 2008/0025724 | A1 | | 1/2008 | Ozaki .............................. 398/68 |
| 2008/0037981 | A1 | | 2/2008 | Mukojima ....................... 398/10 |
| 2008/0247766 | A1 | | 10/2008 | McCaul et al. ............... 398/202 |
| 2009/0123154 | A1 | | 5/2009 | Dalton et al. ................... 398/98 |
| 2009/0268606 | A1 | * | 10/2009 | DeLew et al. ................. 370/216 |
| 2009/0274471 | A1 | | 11/2009 | Bowler et al. ................. 398/197 |
| 2010/0183295 | A1 | | 7/2010 | Dalton et al. ................... 398/16 |

OTHER PUBLICATIONS

Martin Carroll, "*Rogue ONU Draft Supplement*," International Telecommunication Union Telecommunication Standardization Sector (ITU-T), Nov. 23, 2010, pp. 1-6.

* cited by examiner

*Primary Examiner* — Leslie Pascal
(74) *Attorney, Agent, or Firm* — Fish & Richardson P.C.

(57) ABSTRACT

In accordance with a non-limiting example, an Optical Network Unit (ONU) includes an optical transmitter that has a laser diode and laser driver connected to the laser diode and configured to drive the laser diode so that the laser diode emits an optical communications signal based on transmit data signals. A feedback circuit includes a monitoring photodiode that receives optical feedback signals from the laser diode. A watchdog circuit is connected to the monitoring photodiode and laser driver and includes a logic circuit configured to process the feedback signals and transmit signals to determine if the ONU is rogue. This logic circuit in one example is an XOR logic circuit.

20 Claims, 4 Drawing Sheets

US 8,582,969 B1

PASSIVE OPTICAL NETWORK (PON) HAVING OPTICAL NETWORK UNIT (ONU) USING FEEDBACK TO DETECT ROGUE CONDITIONS AND RELATED METHOD

FIELD OF THE INVENTION

This invention relates to communications systems, and more particularly, this invention relates to a Passive Optical Network (PON) having at least one Optical Network Unit (ONU) connected to an Optical Line Terminal (OLT).

BACKGROUND OF THE INVENTION

In a Time Division Multiplexing (TDM) Passive Optical Network (PON), such as a Gigabit Passive Optical Network (GPON), an Optical Network Unit (ONU) at the customer premises (or other location) may disrupt an upstream transmission for other customers on the PON. In those circumstances, those skilled in the art typically refer to the ONU as a "rogue" ONU. An ONU goes rogue for a number of different reasons, for example, as when the rogue ONU tries to transmit outside of its allocated timeslot, fails to reduce optical power sufficiently when not transmitting (effectively raising the noise floor for other ONU's) or experiences other technical failures. This rogue condition can result from a hardware/software failure or a malicious attack, for example, from a hacker. Regardless of the cause of a rogue ONU, this condition can potentially disable the entire PON.

The International Telecommunication Union Telecommunication Standardization Sector (ITU-T) community is currently cataloguing methods for detecting and correcting rogue conditions. This community has considered the addition of a "watchdog" circuit to the ONU outside the transceiver to monitor the ONU transmitter and ensure that the ONU complies with instructions from the Optical Line Terminal (OLT), which is typically located at the Central Office (CO). This watchdog circuit shuts down the ONU transmitter after determining that the ONU is exhibiting rogue behavior. In one proposal from ITU-T, a watchdog circuit located outside the transceiver monitors the ONU "transmit enable signals," used to turn the ONU laser off and on, to detect and enforce ONU compliance. Greater control at the transmitter and closer to the laser, however, is desired.

SUMMARY OF THE INVENTION

In accordance with a non-limiting example, the Optical Network Unit (ONU) includes an optical transmitter that has a laser diode and laser driver connected to the laser diode. The laser driver provides input data signals to the laser diode which are emitted by the laser diode as optical signals. A feedback circuit from the laser diode to the laser driver includes a monitor photodiode (mPD) positioned to receive optical signals from the laser diode and produce feedback signals to the laser driver. A watchdog circuit may be connected to the monitor photo diode feedback signal and to the transmit data signals at the input to the laser driver. This watchdog circuit includes a logic circuit configured to process the feedback signals and the transmit data signals to determine if the ONU is rogue. This logic circuit in one example is an XOR logic circuit. In one embodiment, the XOR circuit would produce a high logic level ("1" bit) output when the logic level of the input data signal does not match the logic level of the data signal emitted by the laser, indicating a rogue condition. In another embodiment, "M" or more "1" bits out of a group of "N" bits from the XOR circuit would indicate a rogue condition.

In an example, the XOR logic circuit is formed as a transistor circuit. An alarm circuit is connected to the logic circuit and configured to trigger an alarm signal if the ONU is determined to be rogue. A power circuit is connected to the laser driver and alarm circuit and configured to receive the alarm signal and in response thereto, to remove power to the laser diode.

A Passive Optical Network (PON) is also disclosed and includes an Optical Line Terminal (OLT) such as located at a Central Office facility. This OLT communicates typically with a plurality of Optical Network Units connected thereto.

A method is also set forth.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
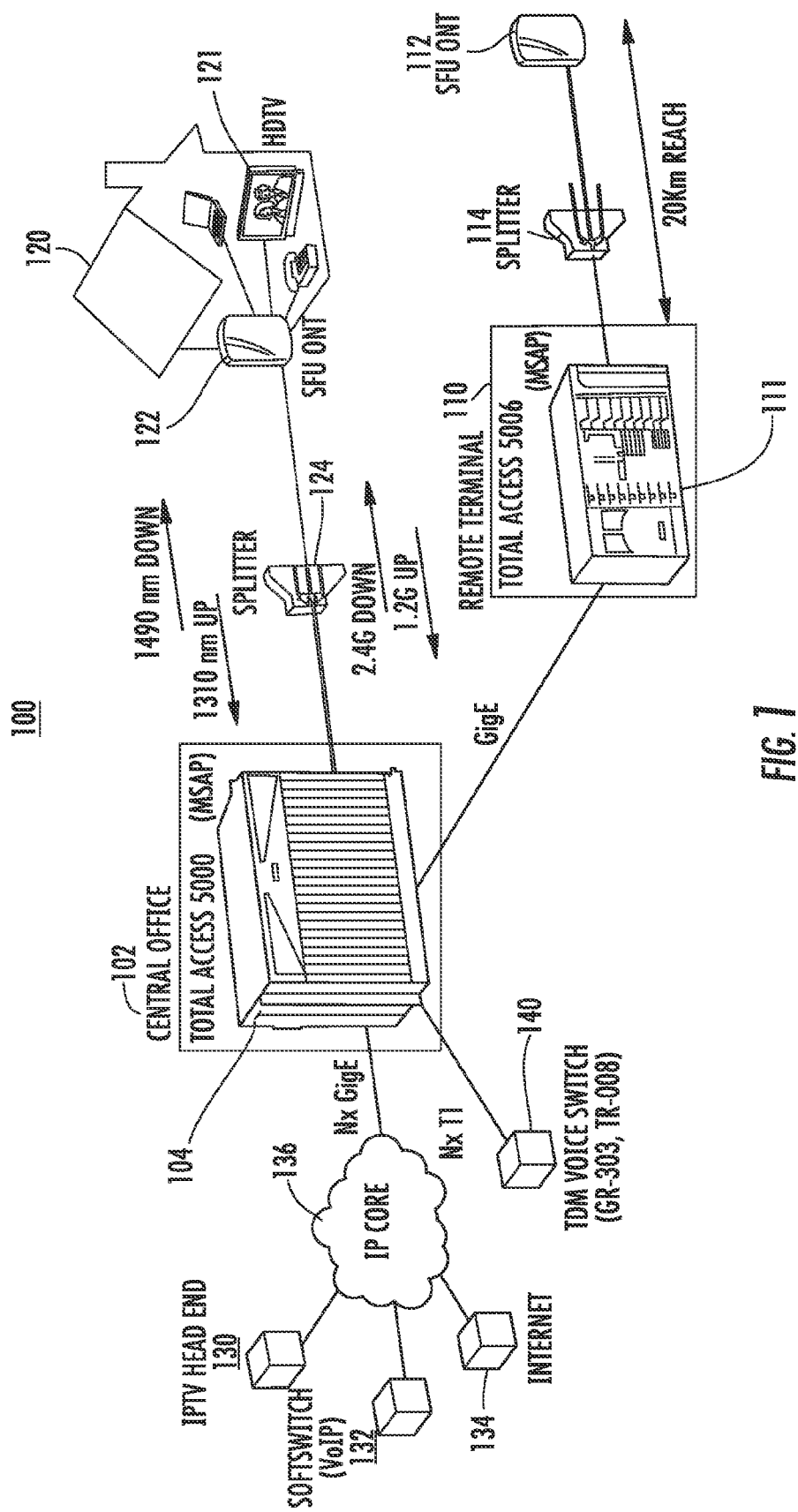
FIG. 1 is a high-level diagram of a communications network as a Passive Optical Network (PON) and a MSAP (Multi-Service Access and Aggregation Platform) at the Central Office and typically including at least one Optical Line Terminal (OLT) and connected to a home premises that includes the Optical Network Unit (ONU) in accordance with a non-limiting example.

FIG. 1 is a block diagram showing a communications system 100 as a Passive Optical Network (PON) that incorporates various components that can be used in accordance with a non-limiting example, showing as an example a specific embodiment using various components such as manufactured by the assignee, ADTRAN, INC. of Huntsville, Ala. A Central Office 102 includes a MSAP (Multi-Service Access and Aggregation Platform) 104 such as a Total Access 5000 platform as manufactured by ADTRAN, INC., which connects to another Remote Unit 110 having a MSAP 111, such as a Total Access 5006, which connects to a single family unit (SFU) Optical Network Unit (ONU) 112 through a splitter 114. The MSAP 104 at the Central Office 102 also connects, via a splitter 124, to a home premises 120 that includes a HDTV 121 as an example and other home devices through a single family unit (SFU) optical network unit 122. The MSAP 104 may also connect to an IPTV headend 130, a soft switch 132, and Internet 134 through an IP core 136. The MSAP 104 may also connect to a TDM voice switch 140 in a non-limiting example.

The MSAP at the Central Office 102 in this non-limiting example includes a number of Gigabit Passive Optical Network (GPON) OLT (Optical Line Termination) access modules. GPON encapsulation mode (GEM) is used to carry Ethernet traffic between the OLT and the ONU. The Optical Distribution Network (ODN) is located between the OLT and any ONU. Typically the ODN includes fibers and passive splitters as illustrated for allowing Fiber to the Premises (FTTP).

An SFU ONU is typically a unit mounted on the side of a home with box-in-box, weatherproof, and access controlled construction. Typically, SFF transceivers, which are soldered to an ONU board, are used for the ONU.

As noted before, each Passive Optical Network uses various optical transceivers, one at the optical line terminal at the Central Office and one at each of the optical network units. Each transceiver includes both transmit and receive functions, wherein the optical transceiver includes a laser driver and laser for the transmit path and a photodetector, transimpedance amplifier (TIA), and in some cases, a limiting amplifier for the receive path. A bi-directional optical transceiver also incorporates a filter to separate transmit and receive wavelengths. A transceiver that is a triplexor typically separates three wavelengths. The filtering required is therefore more complex. Sometimes all of the filtering functionality is included in the transceiver. Other times a separate WDM (Wavelength Multiplexer/Demultiplexer) is used that is not part of the transceiver.

The International Telecommunication Union Telecommunication Standardization Sector (ITU-T) G.983.3 and G.984.2 standards can be used to define the optical characteristics of a PON with three wavelengths: 1490 and 1310 nm for data and 1550 nm to support RF broadcast video. The 1490 nm optical signal is used for downstream data (from OLT to ONU) and the 1310 nm optical signal is used for upstream data (from ONU to OLT). The 1550 nm service is optional. Burst-mode receiver electronics in the OLT transceiver enable a single transceiver in the Central Office to communicate with transceivers in the plurality of optical network units on the same PON through the use of "time slots" and time-division multiple access (TDMA) techniques.

Figure 2:
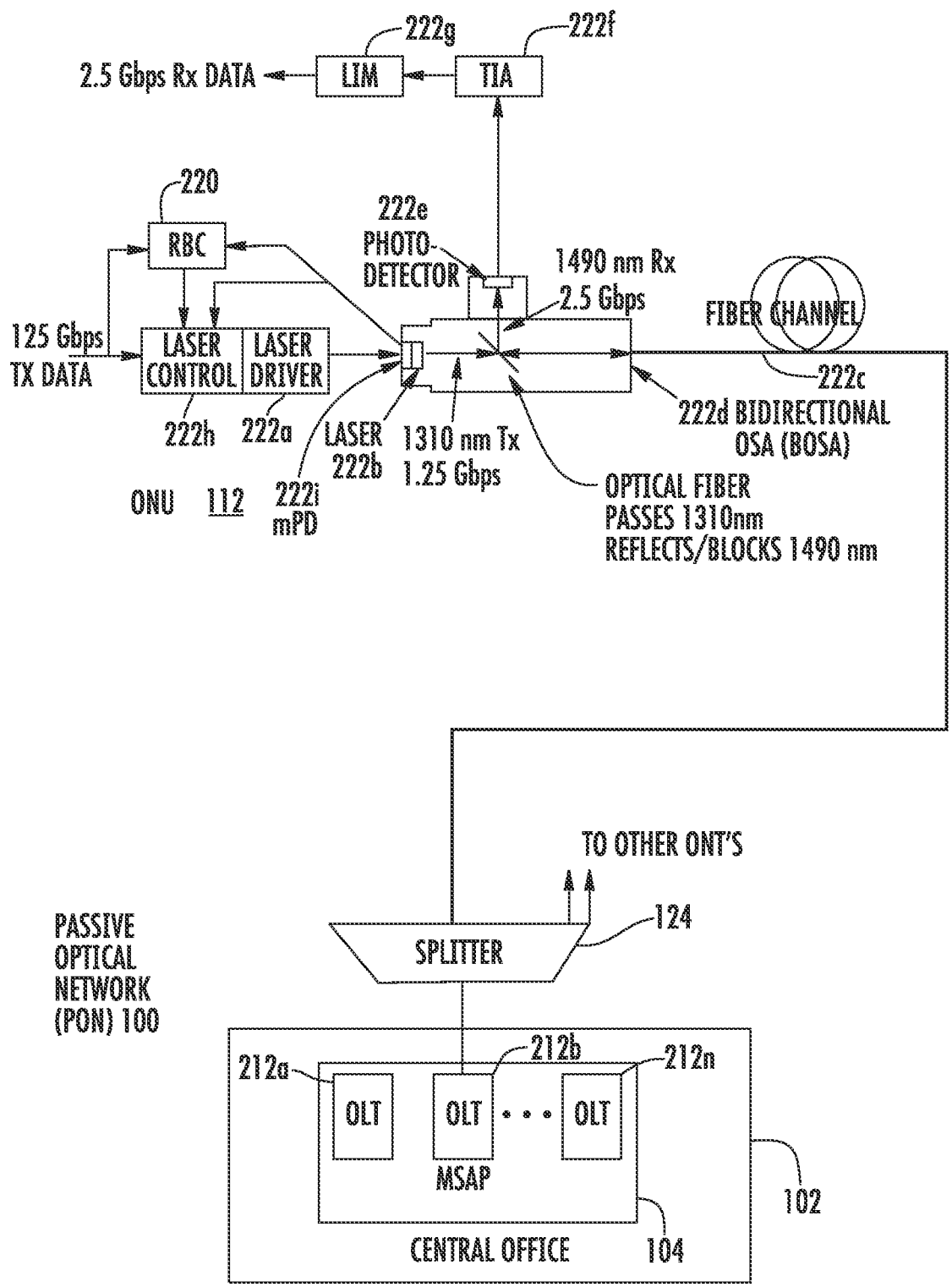
FIG. 2 is a block diagram showing an OLT at a Central Office (CO) and connected to at least one Optical Network Unit (ONU) and showing basic components, including a watchdog circuit in accordance with a non-limiting example.

In accordance with a non-limiting example, FIG. 2 shows a fragmentary drawing view of a communications system as a Passive Optical Network 100 in which a MSAP 104 includes one or more OLT's 212a, 212b . . . 212n positioned at the Central Office (CO) 102. Each OLT transmits optical signals through a respective splitter 124 to a plurality of Optical Network Units (ONU's) 112. In this example, a watchdog circuit 220 located at the ONU, near the ONU transmitter, monitors the ONU transmitter input signals and output signals and transmits an alarm and a reset under rogue conditions. The components as illustrated in this high-level function diagram of FIG. 2 include a laser driver 222a connected to a laser 222b as a laser diode which is connected to a fiber channel 222c via an optical filter 222d in this example. Transmit data is passed to the laser driver, which drives the laser at 1310 nm. The optical filter 222d passes 1310 nm and reflects/blocks 1490 nm, separating the transmit and receive functions. The receive path for signals and data includes a photodetector 222e, transimpedance amplifier (TIA) 222f and limiting filter 222g. A laser control 222h is operative with the laser driver. A monitoring photodiode 222i is shown.

It should be understood that the ONU 112 in this non-limiting example is preferably designed and built with an optical subassembly (OSA) instead of an optical transceiver. An OSA includes an optical receiver and transmitter. In an OSA-based design, the transceiver electronics at the ONU (such as the laser driver, TIA and limiting amplifier) are placed around the OSA on the primary PCB to form complete data transmit and receive paths. Thus, there is access to signals coming to and from the OSA, which contains a laser diode, a photodiode, a monitoring photodiode (mPD) (typically on the same semiconductor chip as the laser diode and typically integrated into the back facet of the laser diode), and filters as explained in greater detail below with reference to FIG. 3, which illustrates a preferred embodiment in which feedback from the monitoring photodiode and transmit data are processed in a logic circuit to determine if the ONU is rogue.

In accordance with a non-limiting example such as the embodiment to be described later relative to the preferred embodiment of FIG. 3, the watchdog circuit 220 is connected to a feedback signal from the mPD that is positioned at the back facet of the laser. An mPD design with sufficient bandwidth can accurately produce a bit-for-bit copy of the signal transmitted by the laser diode. The watchdog circuit has access to this feedback signal and can, therefore, compare the signal transmitted by the laser diode to the transmit data at locations earlier in the data transmit path. Discrepancies between these transmit signal copies can indicate a rogue condition. In one advantageous, but non-limiting example, a dual-loop feedback implementation between the laser driver and laser diode mPD (one loop with a large time constant for average power/bias current monitoring and control and a second loop with a short time constant for extinction ratio/modulation current monitoring and control) provides the watchdog circuit with the bit-for-bit copy of the signal transmitted by the laser diode.

The preferred circuit design, in accordance with a non-limiting example, includes a dual-loop feedback circuit that uses feedback signals to provide data regarding average laser power, but also data regarding laser modulation as shown in the preferred embodiment of FIG. 3 and explained in greater detail below. For example, the mPD feedback signal produces a low level, real-time copy of what the laser is transmitting. This feedback signal provides information on the optical signal at the laser transmitter rather than just the signal at transceiver interface as proposed in other systems, allowing this system to monitor the entire ONU, including optics for any rogue condition instead of just the electronics.

In a preferred embodiment, the feedback signals from the ONU laser's monitoring photodiode are sent to the watchdog circuit, which detects a rogue condition in the ONU. In a preferred example, this watchdog circuit is connected to the monitoring photodiode and to the data inputs to the laser driver. The watchdog circuit in the preferred embodiment includes a logic circuit configured to process the optical feedback signals and data input signals of the laser driver and determine if the ONU is rogue. In the preferred example, this logic circuit comprises an XOR logic circuit.

As will be explained in further detail below, it is also possible that a processor may integrate signals to ensure any transmit power is within appropriate bounds and compare signals to allocated time-slots and ensure that the ONU is transmitting only when directed. The preferred design, however, uses the XOR logic circuit, but may incorporate integration as an adjunct. This preferred embodiment using the feedback can be implemented as part of a larger rogue detection scheme incorporating a variety of measures at each ONU as well as over the entire PON as directed by the OLT.

A rogue ONU is considered rogue if the ONU exhibits a behavior that disrupts the PON in the upstream direction for other ONU's on the PON. Typically, to disrupt other ONU's on the PON, the rogue ONU transmits outside of its time-slot. These types of circumstances typically imply that there is a physical layer malfunction, for example, an optical malfunction, where the laser does not turn off outside of its allowed time-slot or an electronic malfunction occurs in which the electronics do not turn the laser off outside of the allocated time-slot. This could also imply an upper layer malfunction with incorrect translation of the Optical Line Terminal (OLT) commands or malicious manipulation of OLT commands, including malicious hacker involvement with the system.

Figure 3:
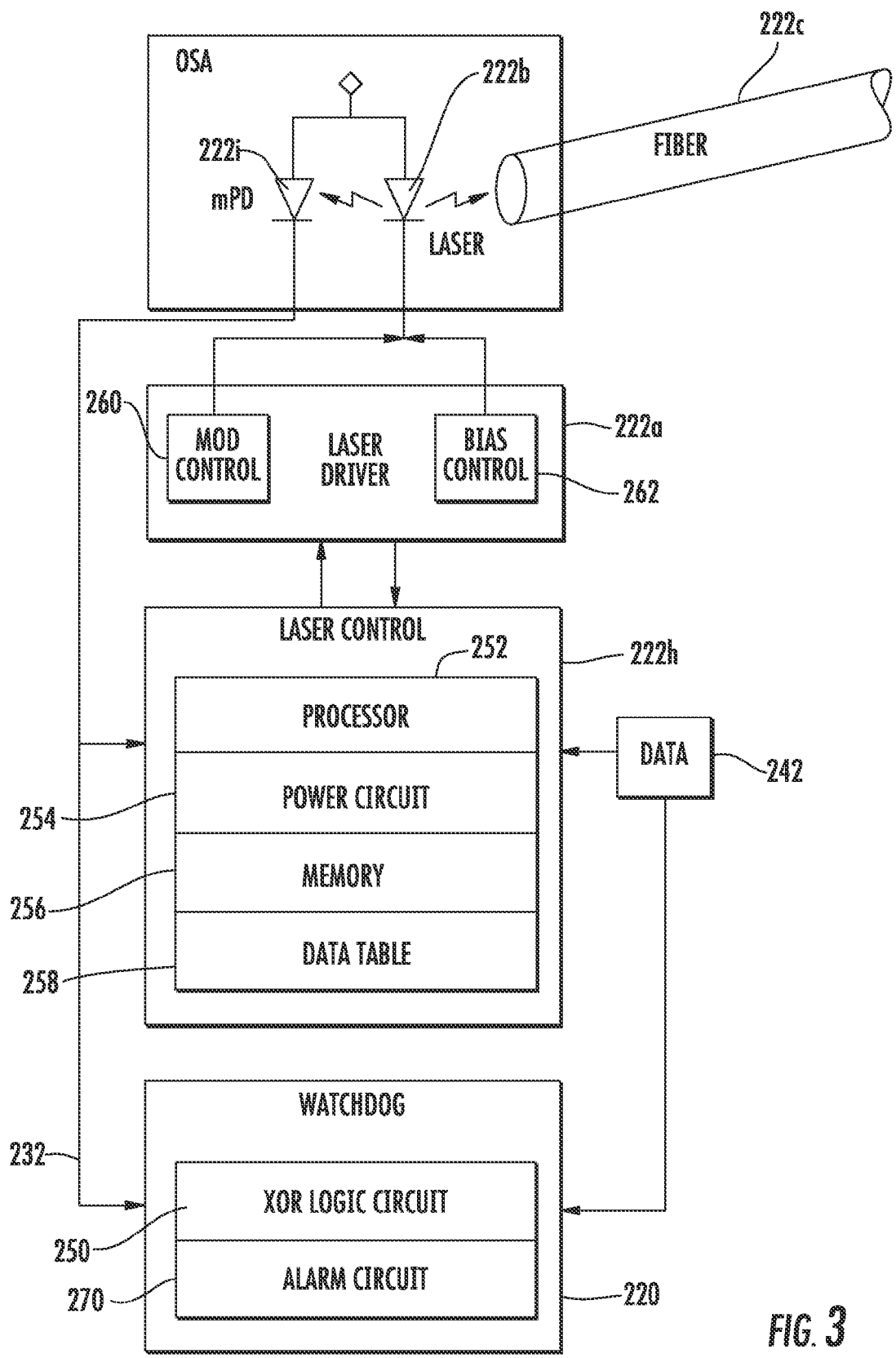
FIG. 3 is a high-level block diagram of a section of an ONU and showing the watchdog circuit that includes an XOR logic circuit connected to various components and operative for determining through feedback via the monitoring photodiode if the ONU is rogue in accordance with a non-limiting example.

In accordance with a non-limiting example, a section of the ONU is illustrated in FIG. 3. The output from the monitoring photodiode 222i is accessible because of the OSA-based approach and can be used as a "rogue" indicator. The watchdog circuit 220 is incorporated in the feedback circuit 232 and immediately and directly detects a rogue condition at the laser diode 222b itself, the interface with the optical fiber 222c. This method facilitates monitoring of the entire ONU transmission path if desired. FIG. 3 is only a basic block diagram illustrating other components besides those shown in FIG. 2. The monitoring photodiode 222i and laser diode 222b are typically the only active transmit path elements inside the OSA. The other basic components and functions of the transmitter in FIG. 3 are outside the OSA. The laser driver circuit 222a is operative with the laser control 222h. The laser driver 222a is connected to the laser diode 222b and configured to drive the laser diode 222b based on data input signals received such as from a data source 242 that could be processed in a processor 252 associated with the laser control 222b and representative of data to be communicated across a communications channel that incorporates the fiber 222c. The feedback circuit 232 includes the monitoring photodiode 222i positioned to receive optical signals from the laser diode such as received at its back facet in one example. The watchdog circuit 220 is connected to the feedback loop from the monitor photodiode 222i, and the laser control 222b and the data source 242. In this preferred example, the watchdog circuit 220 is a logic circuit configured to process the optical feedback signals and received data input signals to determine if the ONU is rogue. This logic circuit 250 comprises an XOR logic circuit in a preferred example. As illustrated, a processor 252 is operative with the laser driver circuit 222a, and includes in association therewith a power circuit 254, memory 256 and a data table 258. The laser control 222h and associated laser driver 222a operates with a modulation control circuit 260 and bias control circuit 262 that interoperate with the laser diode 222b to control modulation and bias of optical transmission of signals into the fiber. The watchdog circuit and laser driver circuit can receive input signals from the other components in the ONU as well.

As illustrated, the watchdog circuit 246 includes an alarm circuit 270 connected to the logic circuit 250 and configured to trigger an alarm signal if the ONU is determined to be rogue. The power circuit 254 is configured to receive the alarm signal and in response thereto, configure the laser control 222h and associated laser driver 222a to remove power to the laser diode 222b in a non-limiting example.

Figure 4:
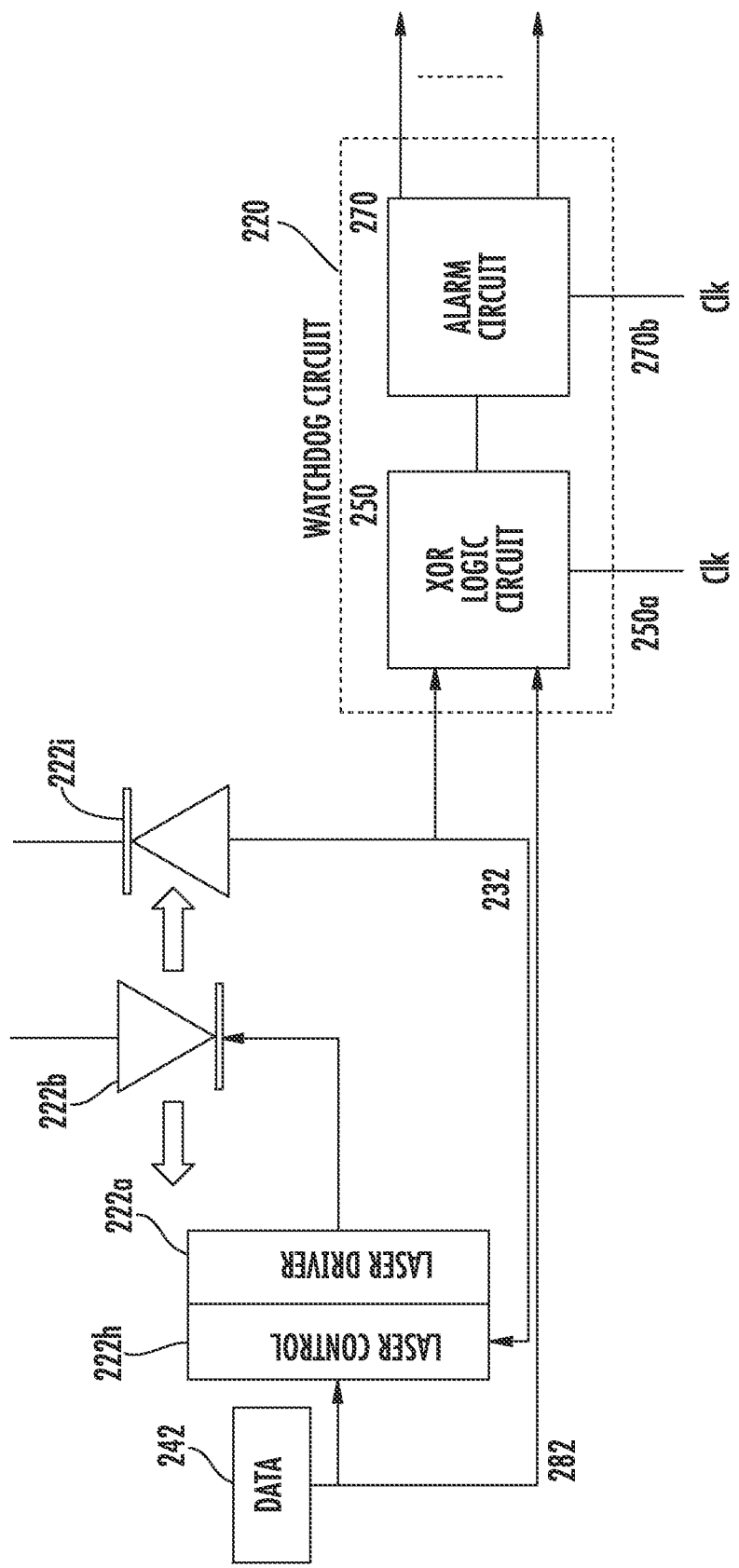
FIG. 4 is a high-level schematic circuit diagram of an example of the XOR logic circuit based watchdog circuit that can be used in accordance with a non-limiting example.

FIG. 4 shows greater details of the XOR based watchdog circuit 220, which includes the XOR logic circuit 250 and the alarm circuit 270 connected thereto and each receiving respective clock signals 250a, 270a as illustrated. The data source 242 and monitoring photodiode 222i are shown connected to the watchdog circuit 220. The laser driver circuit 222a is connected to the laser diode 222b. The mPD provides a feedback signal 232 to the laser control 222h and to the watchdog circuit 220. The XOR circuit can process each pair of input bits serially as currently shown. Alternatively, the two data streams can be fed into a SerDes (Serial/Deserializer) placed in front of a bank of XOR logic blocks followed by an OR logic block of all the XOR outputs. This parallel arrangement allows the XOR logic and clocks to run substantially slower than the serial data rate and still process all bits.

The feedback data 232 from the mPD 222i and the transmit data 282 are processed by the XOR logic 250 in the watchdog circuit. Alternatively, the transmit data 282 input to the XOR logic 250 may be taken from elsewhere in the transmitter instead of from the laser control input, but with appropriate delays added to the mPD feedback 232 input to the XOR logic. If the result is anything other than a "0," then this may signify that there are technical problems with the ONU operation indicative of a rogue condition. Another indication of a rogue condition could be that "M" or more "ones" out of the XOR logic occur in "N" consecutive bit periods. These conditions indicate that the laser has been "on" for an extended time.

There are alternative embodiments. It should be understood that in addition to using the XOR logic circuit as explained, the system can enhance ONU rogue detection using further features and circuit functions as now explained.

The feedback signals from the ONU monitoring photodiode 222i in a flattened optics design can be sent to the watchdog circuit 220 to detect a rogue condition in the ONU. These signals can be used in multiple ways in addition to processing them in an XOR logic circuit as illustrated. 1) They can be integrated to ensure the transmit power is within appropriate bounds, 2) They can be compared to allocated time-slots to ensure the ONU is transmitting only when directed. These designs can be implemented as part of a larger rogue detection scheme that covers the entire PON and is managed by the OLT.

It is possible for the system to monitor the transmitter output using the monitoring photodiode to determine if there is compliance with OLT commands. For example, the system can measure the transmit energy density coming out of the scrambled upstream transmitter signal and integrate it over a period of time that roughly corresponds to the total time required for all ONU's on the PON to have one transmit turn. (This global time period could be supplied by the OLT). The results of this integration typically should not yield more than approximately X % of the total theoretical energy (where X is the fraction of time relative to the global transmit time period allotted to the ONU in question by the OLT). Thus, the ONU should not transmit in more than its timeslot over the sampled period. Should it do so, the algorithm could generate an alarm to the ONU to inform it of its bad behavior. If the condition continues, the algorithm can then gate off the transmitter. It is possible to use a single loop feedback and apply integration techniques. The preferred technique as noted before is the dual loop feedback using the flattened ONU design as explained above. With dual-loop feedback, the system monitors laser bias in real-time (no integration required) to determine if the laser is locked on.

In another example, the system can determine if the Tx-enable signal is synchronous with the start and end of the allotted transmit time slot. It is possible to monitor this signal and respond to rogue behavior by overriding the transmitter behavior or issuing a reset. In a flattened optics design the Tx enable signal can be monitored at the input to the laser driver and correlated with the feedback signal from the mPD output.

In a number of examples as noted generally before, it is also possible to monitor laser modulation and:
1) apply the integration technique;
2) monitor the max/min burst length (never <preamble and delimiter, never >125 us);
3) compare the data/output power to the "Tx enable" signal behavior; and use the preferred technique of
4) XOR mPD output with data transceiver input data at various stages in the transmitter circuitry to detect and locate faults.

The feedback circuit as described before uses the feedback signals to provide information not only about average laser power, but also about the laser modulation in accordance with a non-limiting example as explained above. With this configuration, it is also possible to detect other suspect conditions at the ONU transmitter, including laser overheating, thermal runaway, reduced performance due to aging, etc.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An Optical Network Unit (ONU), comprising:
    an optical transmitter comprising
        a laser diode;
        a laser driver connected to the laser diode and configured to drive the laser diode so that the laser diode emits an optical communications signal based on transmit data signals; and
        a feedback circuit comprising a monitoring photodiode positioned to receive optical feedback signals from the laser diode; and
    a watchdog circuit connected to the monitoring photodiode and laser driver and comprising a logic circuit configured to compare the feedback signals and transmit data signals to determine if the ONU is rogue.

2. The ONU according to claim 1, wherein said logic circuit comprises an XOR logic circuit.

3. The ONU according to claim 2, wherein any non-zero output of the XOR logic circuit is indicative of a rogue ONU.

4. The ONU according to claim 2, wherein any "M" non-zero outputs of the XOR logic circuit over "N" bit period is indicative of a rogue ONU.

5. The ONU according to claim 2, wherein said XOR logic circuit is configured to process each pair of input bits serially or in parallel.

6. The ONU according to claim 1, wherein said watchdog circuit comprises an alarm circuit connected to the logic circuit and configured to trigger an alarm signal if the ONU is determined to be rogue.

7. The ONU according to claim 6, and further comprising a power circuit connected to said laser driver and alarm circuit and configured to receive said alarm signal and in response thereto, to remove power to the laser diode if the ONU is determined to be rogue.

8. A method of detecting a rogue Optical Network Unit (ONU) in a Passive Optical Network (PON), comprising:
    transmitting an optical signal into the PON from the transmitter of the ONU by driving a laser diode based on transmit data signals received from a data source;
    receiving optical feedback signals from a monitoring photodiode positioned within a feedback circuit within the transmitter of the ONU and representative of the transmit data signals received from the data source; and
    comparing the optical feedback signals and the data input signals in a logic circuit to determine if the ONU is rogue.

9. The method according to claim 8, and further comprising processing the feedback signals and transmit signals within the logic circuit as an XOR logic circuit.

10. The method according to claim 9, wherein any non-zero output of the XOR logic circuit is indicative of a rogue ONU.

11. The method according to claim 9, wherein any "M" non-zero outputs of the XOR logic circuit over "N" bit period is indicative of a rogue ONU.

12. The method according to claim 8, and further comprising triggering an alarm signal if the ONU is determined to be rogue.

13. The method according to claim 12, and further comprising receiving the alarm signal and removing power from the laser diode based on the alarm signal.

14. The method of claim 8, wherein processing the optical feedback signals and the data input signals in a logic circuit to determine if the ONU is rogue comprises, for a predetermined bit period, comparing each bit of the data input signals with a corresponding bit of the optical feedback signals.

15. A Passive Optical Network (PON), comprising:
    an Optical Line Terminal (OLT);
    at least one Optical Network Unit (ONU) connected thereto and comprising at least:
        an optical transmitter comprising
            a laser diode;
            a laser driver connected to the laser diode and configured to drive the laser diode so that the laser diode emits an optical communications signal based on transmit data signals; and
            a feedback circuit comprising a monitoring photodiode positioned to receive optical feedback signals from the laser diode; and
        a watchdog circuit connected to the monitoring photodiode and laser driver and comprising a logic circuit configured to compare the feedback signals and transmit data signals to determine if the ONU is rogue.

16. The PON according to claim 15, wherein said logic circuit comprises an XOR logic circuit.

17. The PON according to claim 16, wherein any non-zero output of the XOR logic circuit is indicative of a rogue ONU.

18. The PON according to claim 16, wherein any "M" non-zero outputs of the XOR logic circuit over "N" bit period is indicative of a rogue ONU.

19. The PON according to claim 15, wherein said watchdog circuit comprises an alarm circuit connected to the logic circuit and configured to trigger an alarm signal if the ONU is determined to be rogue.

20. The PON according to claim 15, and further comprising a power circuit connected to said alarm circuit and configured to receive said alarm signal and in response thereto, to remove power to the laser diode if the ONU is determined to be rogue.

* * * * *